Sept. 27, 1932.　　　E. D. McCLOSKEY　　　1,879,371
WATER LEVEL INDICATING DEVICE
Filed Jan. 6, 1932　　　2 Sheets-Sheet 2
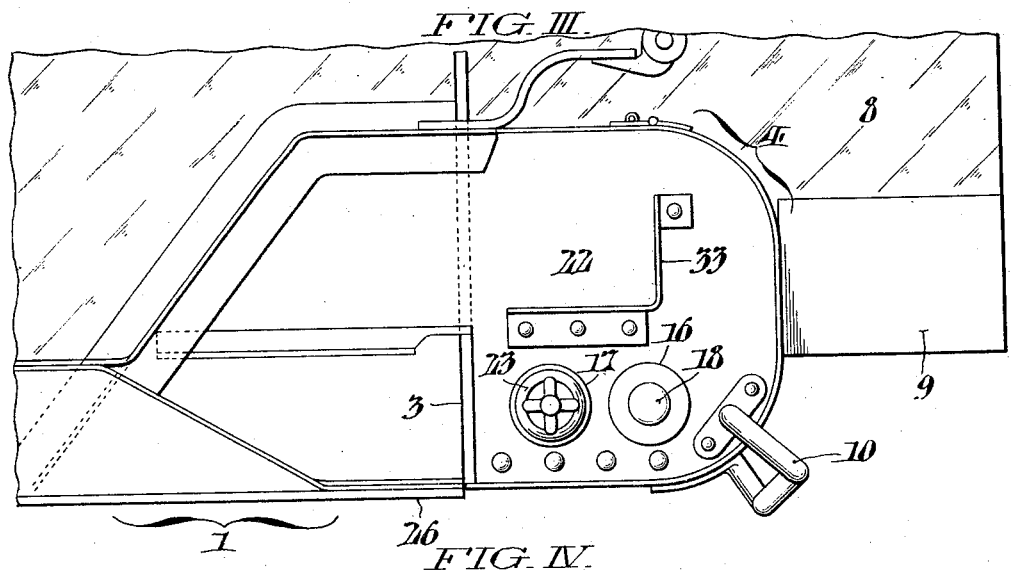
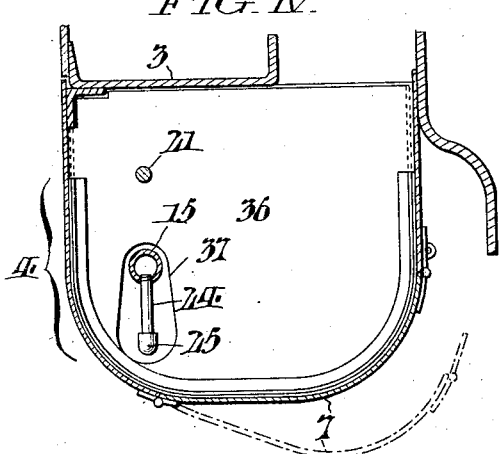
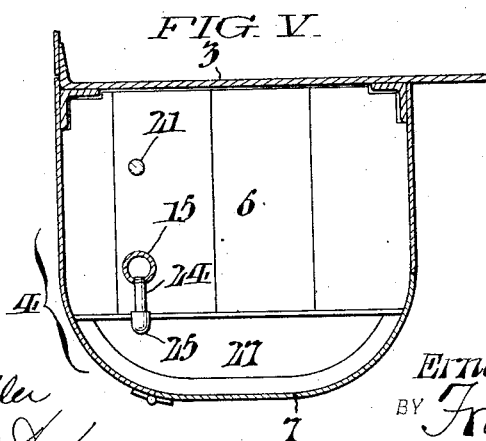
WITNESSES:
INVENTOR:
Ernest D. McCloskey,
BY
ATTORNEYS.

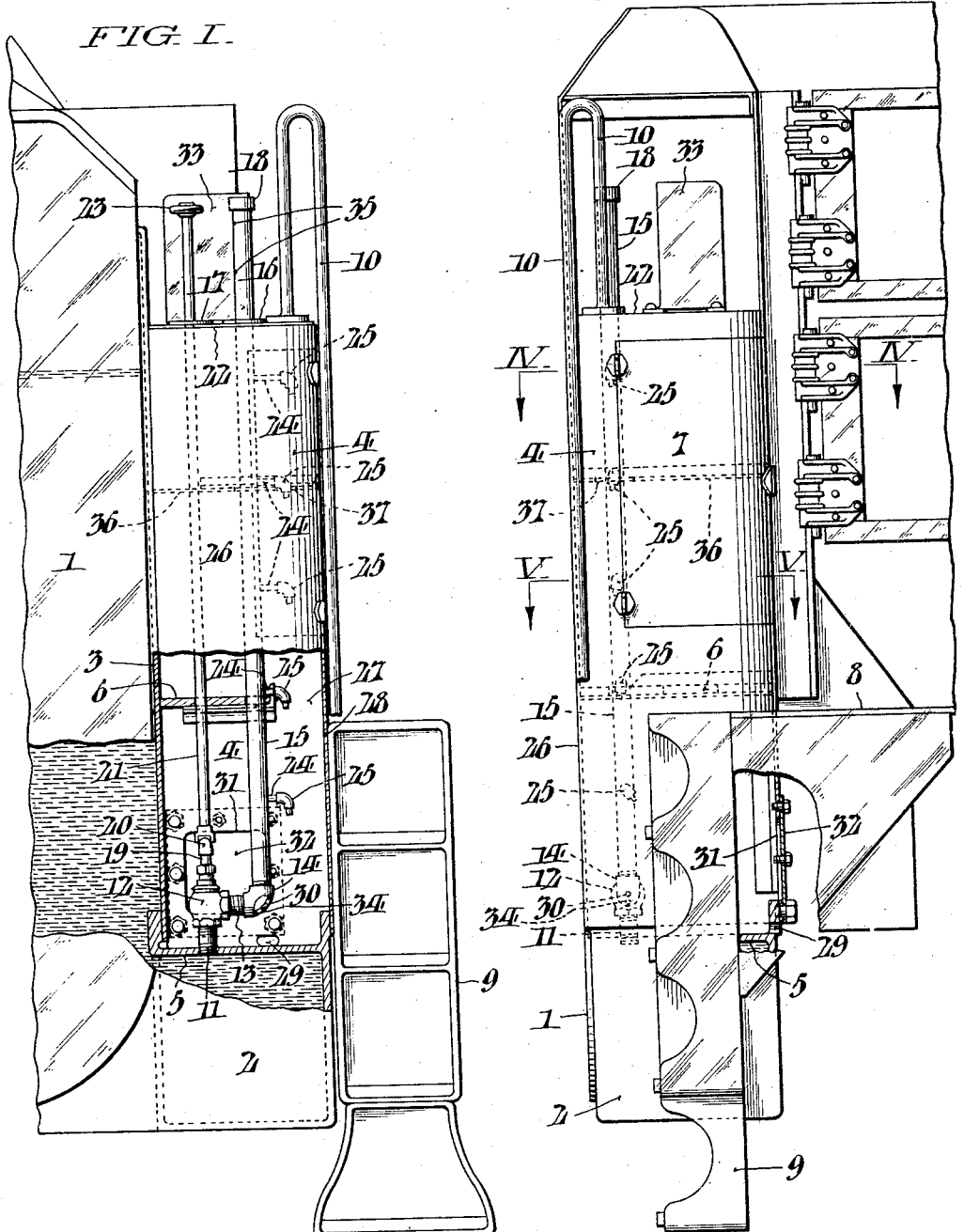

Patented Sept. 27, 1932

1,879,371

UNITED STATES PATENT OFFICE

ERNEST D. McCLOSKEY, OF ALTOONA, PENNSYLVANIA

WATER LEVEL INDICATING DEVICE

Application filed January 6, 1932. Serial No. 584,973.

This invention relates to water level indicating devices and more particularly to devices for determining the level of water in a locomotive tender tank.

Heretofore, one method of ascertaining the water level in a tender tank has been to employ a sounding rod, applied through manholes in the rear of the tender. This procedure requires a perilous and difficult journey from the locomotive cab to the rear of the tender and back again, which discourages frequent checking of the water level. It has also been proposed to employ gages or indicators on tender tanks. When such a gage or indicator is fitted to the outside of a water compartment, its exposed position renders it liable to breakage. On the other hand, when such a gage or indicator and the means for operating the same are situated wholly or partly within a water compartment, the inaccessibility of the parts results in obvious disadvantages.

Accordingly, the principal object of the present invention is to provide a water level indicating device, which is located without the tender tank proper and within a chamber adjoining the front end of the tender, with its fittings readily accessible for inspection or repair, and with its operating means within convenient reach of the engineman or fireman.

Other objects and advantages of the invention will become more fully apparent from the description hereinafter of one example or embodiment thereof which has reference to the accompanying drawings. Of the drawings:

Fig. I represents a side elevation of the forward end of a locomotive tender, showing portions of the water tank and water bottom at the underframe.

Fig. II represents a front end view of the same, showing one side of the tender.

Fig. III represents a top plan view of the same.

Fig. IV represents a cross-section of the same, taken as indicated by the lines IV—IV of Fig. II; and, Fig. V represents an additional cross-section of the same, taken as indicated by the lines V—V of Fig. II.

In the drawings, with particular reference to Fig. 1, a portion of the water tank proper of a locomotive tender is indicated at 1. Beneath the tank 1, a portion of the tender water bottom formed within the underframe is indicated at 2, the water bottom extending forward beyond the front wall 3 of the tank. A chamber 4, such as is commonly provided for the accommodation of tools or other articles, adjoins the front end of the water tank. A horizontal plate or wall 5 separates the chamber 4 from the water bottom 2. The front end chamber 4 is divided by a floor 6 into upper and lower sections, the upper section, within which tools may be stored, having a door 7, and the lower section accommodating certain fittings of the water level indicating device which are hereinafter described. The upper section of the front end chamber is in the present example subdivided by a shelf 36, which, as shown in Fig. IV, is provided with an opening 37. The deck plate at the working area of the tender is indicated at 8; the side steps leading thereto are shown at 9; and the usual hand rail is shown at 10.

At the wall 5 of the water bottom 2, a nipple 11 is provided, leading to the intake side of an angle valve 12. The discharge side of the angle valve 12 communicates through an additional nipple 13 and an elbow 14 with a vertical stand pipe 15. The stand pipe 15 is substantially housed within the front end chamber 4 and extends upward through the floor 6 and the shelf 36 and through a collar 16 at the top plate 22 of the chamber into a point above the highest level reached by the water in the tender tank 1. The upper end of the stand pipe 15 is sealed by means of a cap 18. To the stem 19 of the angle valve 12, there is connected, by means of a universal joint 20, an operating rod 21. The operating rod 21 is substantially housed within the front end chamber 4 and extends upward through the floor 6 and the shelf 36 and through a collar 17 at the top plate 22 of the tool chamber 4, and terminates in a hand wheel 23. Along that portion of the stand pipe 15 which is located within the front end chamber 4, there is a series of vertically spaced outlets to which drain pipes 24 are fitted, each drain pipe terminating in an L 25. The L's 25, with the exception of the uppermost one which projects beyond the others, are so directed that they discharge downward, but at an angle from the vertical, some towards the side 26 of the tender and others in the opposite direction. In order to avoid having the discharge from the uppermost L's 25 splash upon the L's 25 therebelow, the drain pipes 24 are preferably graded as to length. Additional outlets in the form of small holes 35 are provided in that portion of the stand pipe 15 which extends above the top plate 22 of the front end chamber. The discharge from the holes 35 is effected towards the rear and center of the tender in order to avoid splashing water on the person operating the device. Water discharging from the vertically spaced L's 25 is free to pass through the opening 37 in the shelf 36 and through an opening 27 between the forward end of the floor 6 and the exterior wall 28 of the front end chamber directly to the bottom of the chamber. At the bottom of the front end chamber 4, a drain hole 29 is provided leading inward toward the center line of the tender. Two additional small holes 30 and 34 are also provided in the elbow 14, the upper hole 30 being directed laterally and serving as an indicator outlet and the lower hole 34 being directed vertically and serving as a drain hole.

Near the bottom of the front end chamber 4 and at the inner side thereof, there is a rectangular opening 31 through which access may be had to the angle valve 12, the elbow 14, and other parts, the opening being normally closed by a removable flat plate 32. Upon the top plate 22 of the front end chamber 4, there is preferably attached a shield 33, which guards the hand wheel 23 and the upper end of the stand pipe 15 against injury.

The operation of the embodiment of my invention described above is as follows: When the engineman or fireman desires to determine the level of the water in the tender tank 1, he opens the door 7 of the tool chamber 4 and opens the valve 12 by turning the hand wheel 23, which is within convenient reach as he stands on the deck plate 8 of the tender. Thereupon water flows through the valve 12, and the elbow 14 to the stand pipe 15, where it rises until it reaches the level of the water in the tank 1, the water discharging through such of the drain pipes 24 as are below the level of the water in the tank 1. The drain pipes thus function in the manner of try cocks. The discharge from the uppermost drain pipe 24 indicates the approximate water level in the tank. Water issuing from the drain pipes 24 is directed downward and outward toward the side 26 of the tender, and ultimately collects in the bottom of the front end chamber 4 from whence it drains through the hole 29 at the inner side wall of the chamber 4. When the level of water in the tender tank 1 has been ascertained, the angle valve 12 is closed by turning the hand wheel 23. The vertically directed hole 34 in the elbow 14 subsequently allows the water which has collected in the bottom of the stand pipe 15 to drain off so that there is no danger of ice forming in the stand pipe in cold weather.

From the above description, the advantages of the water level indicating device of this invention will be manifest. The device being located entirely without the tender tank proper, its component parts are at all times easily accessible. The replacement or repair of the valve 12 can be readily accomplished by removal of the plate 32 at the opening 31. The universal joint 20 on the operating rod 21 permits the valve 12 to be inserted or removed without removal of the operating rod. At the same time the various fittings of the water level indicating device being housed within the lower section of the front end chamber 4, are in a sheltered position clear of the working area of the tender, and they are so disposed within the chamber as not to interfere with the use of the upper section thereof, for the accommodation of tools or other articles.

While I have described one form or embodiment which this invention may take, it will be apparent, especially to those skilled in the art, that various changes may be made in the form of the water level indicating device herein described and illustrated, without departing from the spirit of my invention as defined in the appended claims.

Having thus described my invention, I claim:

1. In combination with a locomotive tender, including a water compartment, and an adjoining front end chamber for the accommodation of tools or other articles, a water level indicating device comprising a valve disposed within said chamber and accessible through an opening near the bottom thereof, said valve communicating at its intake side with said water compartment, a stand pipe at the discharge side of said valve having a series of vertically spaced outlets, and a rod for operating said valve, said stand pipe and operating rod extending upward within said chamber.

2. In combination with a locomotive tender, including a water compartment, and an adjoining front end chamber for the accommodation of tools or other articles having an opening in the bottom thereof, a water level indicating device comprising a valve housed within said chamber near said opening and communicating at its intake side with said water compartment, a stand pipe at the discharge side of said valve extending upward within said chamber and having a series of vertically spaced outlets, and an operating rod attached to said valve by a universal joint and extending upward within said chamber through a collar in the top thereof.

3. In combination with a locomotive tender, including a water compartment, and an adjoining front end chamber for the accommodation of tools or other articles, a water level indicating device comprising a valve housed within said chamber and communicating at its intake side with said water compartment, a stand pipe at the discharge side of said valve having a series of vertically spaced outlets, drain pipes fitted to said outlets for discharging water therefrom toward the side of the tender, and a rod for operating said valve, said stand pipe and operating rod extending upward within said chamber, and said chamber including a drain leading inward toward the center line of the tender.

4. In combination with a locomotive tender, including a water compartment, and an adjoining front end chamber with a drain at the bottom thereof for the accommodation of tools or other articles, a water level indicating device comprising a valve housed within said chamber and communicating at its intake side with said water compartment, an elbow at the discharge of said valve having a drain hole therein, a standpipe connected to said elbow having a series of vertically spaced outlets, and a rod for operating said valve, said stand pipe and operating rod extending upward within said chamber.

5. In combination with a locomotive tender, including a water compartment, and an adjoining front end chamber divided by a floor into upper and lower sections, with the upper section affording a space for the accommodation of tools or the like, a water level indicating device comprising a valve housed within the lower section of said chamber and communicating at its intake side with said water compartment, a stand pipe at the discharge side of said valve having a series of vertically spaced outlets, and a rod for operating said valve, said stand pipe and operating rod extending upward within said chamber through said floor, and said floor having an opening therein whereby the discharge from said stand pipe falls into the lower section of said chamber.

In testimony whereof, I have hereunto signed my name at Altoona, Pennsylvania, this 2nd day of January, 1932.

ERNEST D. McCLOSKEY.